2,987,507
PREPARATION OF NYLON POLYMERS
Irving E. Levine, Berkeley, Calif., assignor to California Research Corporation, San Francisco, Calif., a corporation of Delaware
No Drawing. Filed Nov. 26, 1957, Ser. No. 698,918
4 Claims. (Cl. 260—78)

The present invention relates to the preparation of nylon polymers. More particularly, the invention has to do with a process for the polymerization of a nylon polymer having a predetermined melting point by a suspension polymerization process in which a precursor nylon salt suspended in solid form in a nonsolvent liquid for both it and the final polymer is subjected to polymerizing conditions such as to maintain a suspension of substantially un-agglomerated reaction product particles throughout the polymerization reaction.

Nylon polymers, or superpolyamides capable of forming fibers and having molecular weights in excess of about 10,000, are ordinarily prepared by a melt-polymerization process involving the condensation of a suitable diamine and dibasic acid with ordinary heating to liberate water. Often it is advantageous to isolate and purify the salt, the product resulting from the first stage of the polymerization reaction, as shown, for example, in U.S. Patent No. 2,130,947, the salt being then heated under controlled conditions of temperature and pressure to expel water of condensation and effect polymerization. Polymerization is carried out under an inert atmosphere, e.g., nitrogen. A nonsolvent diluent has also been proposed as the inert environment for the reactants. Whether the reaction is carried out batchwise or continuously, conditions of polymerization are such that reactants and polymer at the end of reaction are in a molten condition. Although widely used, melt polymerization is fraught with certain disadvantages. Thus, as polymerization progresses, the viscosity of the melt increases, stirring becomes extremely difficult, and the viscosity of the final polymer becomes limited. This gives rise to poor heat transfer properties. As a result, long reaction times are required, and undesirable side reactions occur with the formation of a non-uniform product. Finally, in melt polymerization it is necessary to quench large masses of high viscosity molten polymer from high to low temperatures. The reaction products cannot be rapidly cooled en masse, as a result of which portions of the reaction mass are subjected to differences in temperature and time of reaction whereby to give materials of different degree of polymerization and hence a final product having an undesirable molecular weight range.

Accordingly, it is an object of the present invention to provide a nylon polymerization process wherein a reaction mixture of low viscosity prevails from the start to the finish of the polymerization reaction.

Another object of the invention is to provide a nylon polymerization process in which the reaction mixture can be stirred easily.

A further object of the invention is to provide a nylon polymerization process in which heat can be readily transferred throughout the reaction mass.

Yet another object of the invention is to provide a nylon polymerization process capable of producing uniform nylon polymer of uniform particle size.

The objects and advantages of the invention will be apparent from the ensuing description of the invention.

Broadly, the present invention contemplates a process for producing a nylon polymer, which comprises suspending a precursor nylon salt in a liquid in which both the salt and final polymer are insoluble, e.g., straight chain aliphatic hydrocarbons, such as octane, tetradecane, eicosane and higher molecular weight hydrocarbons or mixtures of these, such as may be obtained from kerosene and white medicinal oil. Polymerization of the salt is then effected at temperatures sufficiently high to eliminate water but below a temperature at which a suspension of solids in the nonsolvent is destroyed or a substantial agglomeration of solid particles in the nonsolvent diluent occurs. Thus, in accordance with an embodiment of the invention the suspended nylon salt is initially heated below the melting point of the salt with the liberation of water followed by a controlled increase in temperature with continuing liberation of water to advance the polymerization reaction, solid particles remaining suspended throughout the polymerization reaction. Following the polymerization reaction solid free-flowing polymer particles are separated from the nonsolvent, as by filtration, and further treated to remove occluded nonsolvent liquid.

In a more specific embodiment of the invention, diamine-dicarboxylic acid nylon salt, obtained for example in accordance with U.S. Patent No. 2,130,947, is suspended in a nonsolvent, e.g., a nonaromatic hydrocarbon liquid, such as a narrow cut of kerosene or white medicinal oil having a boiling point range either above or below the melting point of the final polymer. The suspension of nylon salt is initially heated to a temperature below the melting point of the salt, preferably at a temperature of 15–20° C. below the melting point of the salt. Temperatures just below the melting point of the nylon salt as well as lower temperatures, down to 50° C. below the melting point, or temperatures at which water continues to be evolved without changing the physical nature of the suspension, can be employed. Lower temperatures, of course, reduce the rate of polymerization with consequent longer reaction times, while higher temperatures make it more difficult to maintain a suspension of unagglomerated solids in the nonsolvent.

At the beginning of the polymerization reaction, a large amount of water is evolved, and its ready removal from the reaction zone expedites the polymerization reaction. One way of facilitating the removal of water is to employ under reduced pressure a nonsolvent having a boiling point above the melting point of the salt. Or a nonsolvent having a boiling point below the melting point of the salt can be employed, the reaction being carried out under pressure, if desired, to reach the required temperature. Preferably employed are temperatures and pressures at which the nonsolvent medium is refluxing, thereby facilitating the removal of water and practically obviating the necessity for additional stirring. If desired, an inert gas, e.g. nitrogen, may be passed through the reaction mass, thereby facilitating the purging of water from the system.

It will also be found advantageous at times to employ a small amount of a lower boiling nonsolvent, for example, up to 10 volume percent xylene, in the early stages of polymerization, to assist in the removal of water by azeotropic action. Subsequent withdrawal of the low-boiling non-solvent fraction permits gradual controlled increase in temperature.

Since the polymerization reaction is a condensation reaction with the liberation of water, any temperature below the melting point of salt, and, during polymerization, of intermediate polymer and of the finished polymer is suitable so long as water is evolved. However, as above indicated, a satisfactory operating initial polymerization temperature is one of 15–20° C. below the melting point of the salt. This temperature is maintained until the degree of polymerization is such that the melt point of the intermediate polymer product exceeds that of the salt. Ordinarily the initial heating stage will last for a period of time varying from about 2.5 to 10 hours, depending of course on the pressure employed and the amount of water evolved.

In general, since the polymerization is a condensation reaction with the liberation of water, the amount of water liberated is an index of the degree of polymerization, which can be converted into molecular weight or viscosity criteria, which in turn can be correlated with melting point of intermediate polymer thereby indicating the temperature to be employed during the course of the reaction. As a practical, safe guide, it has been found that good results can be obtained by maintaining the temperature below the melt point of the salt until about 50% up to about 70% of the theoretical amount of water expected from the reaction has been removed from the polymerization zone. At this point the temperature can be raised gradually up to a temperature sufficiently high to liberate more water, but below a temperature at which the suspended solid particles agglomerate. A temperature up to about 10° C. below the melting point of the final polymer, achieved by a gradual increase of temperature, e.g., about 1° C. for every two, preferably four, to ten minutes will be found satisfactory.

Depending on the conditions employed and the diamine used, some of the diamine may distill over with the water. This loss can be compensated by the addition of make-up diamine to the polymerization zone.

As an example of the invention, about 41 g. of nylon salt obtained from hexamethylene diamine and adipic acid (M.P.=184° C.) was mixed with 100 ml. of a kerosene cut (boiling point range, 170–180° C. at 100 mm. Hg), in a 500 ml., round bottom flask equipped with a distilling head leading to an iced trap and then to a vacuum pump via a monostat capable of controlling pressure in the range of 1–760 mm. Hg. The flask was evacuated to a pressure of 80 mm. Hg. and then heated with a mantle from 25° C. to 175° C. in 2.2 hours while raising the pressure from 80 to 159 mm. Hg. During this time 0.2 ml. of water distilled out.

The temperature was increased to 190° C. from 175° C. by raising the pressure to 239 mm. in 0.5 hour. During this time an additional 2.3 ml. of water, most of it distilling out below 184° C. was accumulated. In completing the polymerization reaction, the pressure was raised to atmospheric and the temperature to 242° C. over a four-hour period. About 2.8 ml. of water distilled in this step, yielding a total of 5.2 ml. (100% of theory). The reaction products were cooled, and the free-flowing polymer was separated from the kerosene, and washed free of adsorbed kerosene with pentane. The polymer was then dried to constant weight at 180° C. at 1 mm. in two hours. The final polymer had a melting point of 265° C. and 0.5 g. of this polymer in 100 ml. solution of metacresol at 100° F. had a reduced viscosity of 2.0.

As another example of the invention, about 40 g. of nylon salt obtained from adipic acid and metaxylylene diamine (M.P.=180° C.) was suspended in a mixture of 100 ml. mineral oil (boiling point range =170–180° C. at 100 mm. Hg) and 25 ml. xylene. The suspension was heated from 24° C. to 170° C. in 6 hours 24 minutes, during which time 1.3 ml. of water distilled over. The temperature was then raised to 175° C. over a period of an hour and 40 minutes, there being collected an additional 1.4 ml. of water. In the last stage there was added make-up xylylene diamine in an amount equivalent to that lost in the previous steps, namely, 0.68%, based on salt. The temperature was raised from 175° C. to 210° C. over a period of 8 hours and 42 minutes, 2.4 ml. of water being collected during this period. The product mixture was cooled, filtered and treated as before. The dried polymer has a melting point of 245° C.

Practice of the invention in the manner described herein results in a high-viscosity polyamide which is free-flowing, of a size approximately the same dimensions of the original nylon salt crystals, and which may be used without costly and involved molding and chipping operations necessary in a melt-polymerization process. Moreover, the presence of the non-solvent medium permits rapid removal of heat, as by conventional heat exchanges or flash evaporation of non-solvent, whereby time and temperature applied to the whole of the mass are fairly uniform, thus permitting the preparation of a molecularly more uniform product.

I claim:

1. A process for producing a superpolyamide from a precursor diamine-dicarboxylic acid salt which comprises suspending in a polymerization zone said salt in a non-solvent for both the salt and superpolyamide, heating the suspension to a temperature sufficiently high to liberate water but below the melting point of the salt, continuing said heating until about 50% to 70% of the theoretical amount of water of condensation has been evolved, thereafter gradually raising the temperature up to a point at least about 10° C. below the melting point of the polymer to liberate more water and recovering free-flowing polymer, the boiling point of the non-solvent being sufficiently high so that substantially all of it is retained during the course of the reaction.

2. Process according to claim 1, wherein the salt is hexamethylene diammonium adipate.

3. Process according to claim 1, wherein the salt is metaxylylene diammonium adipate.

4. Process according to claim 1, wherein the non-solvent is refluxed during the course of the reaction.

References Cited in the file of this patent

UNITED STATES PATENTS

| | | |
|---|---|---|
| 2,172,374 | Flory | Sept. 12, 1939 |
| 2,190,770 | Carothers | Feb. 20, 1940 |
| 2,865,895 | Pieper et al. | Dec. 23, 1958 |

FOREIGN PATENTS

| | | |
|---|---|---|
| 614,625 | Great Britain | Dec. 20, 1948 |